United States Patent Office 2,961,340
Patented Nov. 22, 1960

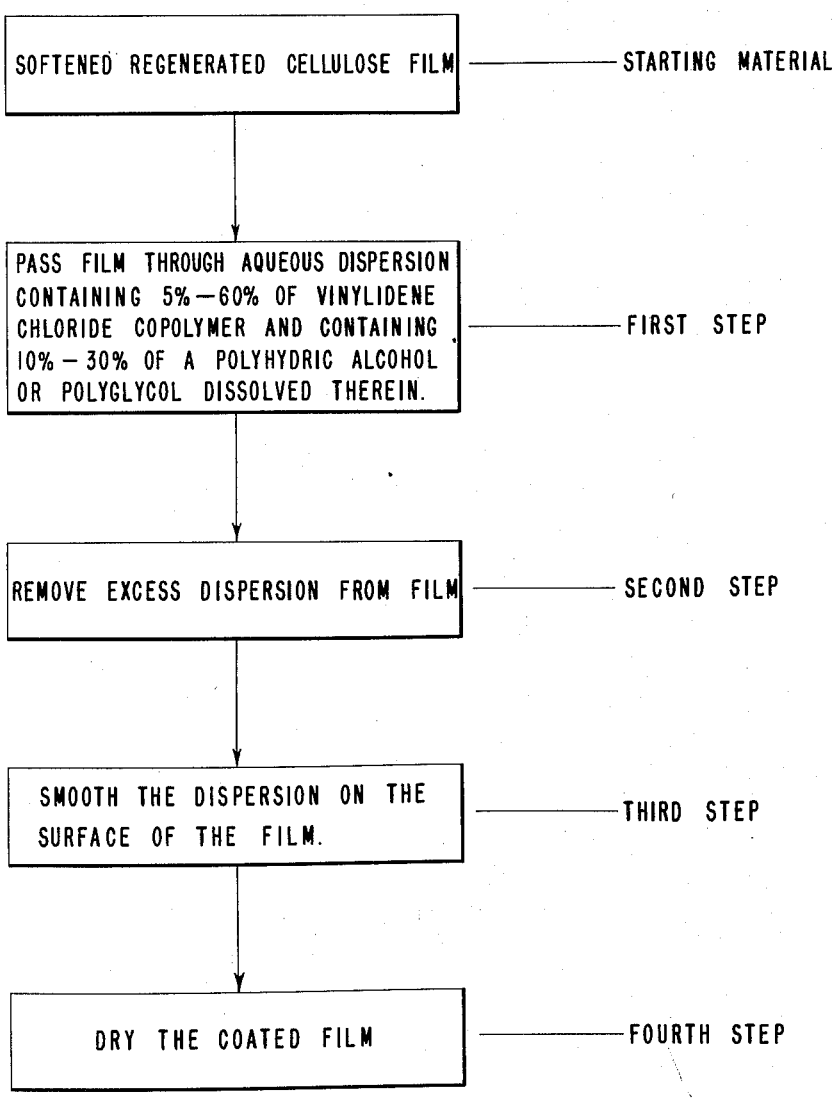

2,961,340
PROCESS FOR COATING HYDROPHILIC FILMS

John Warren Meier, Madison, Tenn., assignor to E. I. du Pont de Nemours and Company, Wilmington, Del., a corporation of Delaware Filed Mar. 30, 1956, Ser. No. 574,990

9 Claims. (Cl. 117—64)

This invention relates to the manufacture of packaging film and more particularly to coating hydrophilic films with compositions containing coalescible, organic, polymeric, film-forming materials.

Coating films, particularly hydrophilic regenerated cellulose film, is employed to provide moisture resistance and heat-sealability, properties that are usually not inherent in the base film. The most desirable compositions are those containing film-formers which, by coalescing on the surface of the film, provide moisture resistance and heat-sealability without detracting from the strength, flexibility, and transparency of the base film. Copolymers of vinylidene chloride, particularly those in which at least one other mono-olefinic monomer copolymerizable with vinylidene chloride is an alkyl acrylate, alkyl methacrylate, methacrylonitrile, methyl vinyl ketone or vinyl chloride, fall into this category. These copolymers may also contain itaconic, acrylic or methacrylic acids as suggested in U.S. Patent 2,570,478.

Heretofore, the most successful application of these coalescible copolymer coatings to regenerated cellulose film has been from solutions in organic solvents. However, the use of organic solvents is expensive: the solvent must be evaporated, then wasted to the atmosphere or recovered in special equipment. The volatility of organic solvents poses problems of controlling the coating operation, particularly when elevated temperatures are used. Organic solvents may also be hazardous: some are inflammable and others are toxic.

Applying these coalescible, polymeric coatings from aqueous dispersions onto a hydrophilic base film such as regenerated cellulose film, although reducing the expense and hazard obstacles, poses more problems. The loss of water into the hydrophilic base film tends to set or coalesce the polymeric coating prematurely. The time available for removing excess, smoothing and spreading the coating evenly over the surface of the film is reduced substantially. The result is usually a streaky, non-uniformly coated film: an undesirable film from the standpoint of unsatisfactory appearance and poor physical properties particularly moisture resistance and heat-sealability.

The object of the present invention is an aqueous coating composition for hydrophilic base films which will not set prematurely, yet will provide desirable improvements in moisture resistance, heat-sealability, etc. in the coated film. A further object is a process for uniformly coating regenerated cellulose film with a coating containing a coalescible, organic, polymeric, film-forming material, particularly a vinylidene chloride copolymer, from an aqueous dispersion. Other objects will appear hereinafter.

The objects are accomplished by dissolving 10%–30%, based on the total weight of an aqueous dispersion, of a compound selected from the group consisting of polyhydric alcohols and polyglycols in the aqueous dispersion containing 5%–60%, preferably 35%–60%, of a coalescible, organic, polymeric, film-forming material, preferably a copolymer of vinylidene chloride with at least one other mono-olefinic monomer copolymerizable with vinylidene chloride. The drawing, which comprises one figure, is a flow diagram illustrating the process of coating in accordance with the present invention.

By polyhydric alcohols are meant compounds having the general formula $A(OH)n$ wherein A is an $n$-valent aliphatic hydrocarbon radical, O is oxygen, H is hydrogen and $n$ is an integer equal to 2 or more. By polyglycols are meant dihydroxypolyethers with hydroxyl groups on the terminal hydrocarbon radicals which may be represented by the general formula $H(OB)_x OH$, wherein B is a divalent hydrocarbon radical and $x$ is an integer equal to 2 or more. In general, the only further limitation on these compounds is that the particular compound selected from within the group dissolve to the extent required above (10%–30%) in the aqueous dispersion.

Ordinarily, coatings of vinylidene chloride copolymers .00003″–.0008″ thick, as dried, are used in coating regenerated cellulose film. Such coatings coalesce, set or harden (all interchangeable terms as used in this specification) within about 0.05–0.3 second. However in conventional apparatus where regenerated cellulose film is coated in a continuous operation at running speeds of about 100 yds./min., 0.3 second, the maximum hardening time, corresponds to about 1.5 feet, hardly enough space to have "doctor" rolls to remove excess coating and a series of smoothing rolls to spread the coating uniformly over the film. The additives of this invention, when incorporated in the aqueous coating dispersion in accordance with this invention, provide at least about 0.5 second additional time. In other words, these additives serve to retard setting up the vinylidene chloride copolymer by about 0.5 second or more and thus provide at 100 yds./min., an additional 2.5 feet, within which to remove excess coating and to smooth the coating on the surface of the film.

It has been discovered that a minimum of 10% of the retardant in the aqueous dispersion will provide adequate retardation for the purpose of the present invention. However, it is generally safe to use the retardant in concentrations up to 30%. When over 30% is used, the retardant may not be completely absorbed into the base film. Any excess retardant remaining on the surface of the film will impart tackiness to the film, a nuisance when the coated film is wound on a roll for storage and shipping and then subsequently removed for use. The optimum concentration for any particular retardant within the group of compounds specified above depends on its water solubility, molecular weight and original physical state (solid or liquid). For example, a concentration from 18% to 23% has been found to be the optimum for ethylene glycol. The optimum concentration for a retardant compound will also depend to some extent on the identity of the other ingredients in the coating compositions, particularly the coalescible film-former, and the thickness of coating on the surface of the film.

In a specific embodiment of this invention, a viscose solution was extruded through a slotted hopper into a solution of sulfuric acid and sodium sulfate to form a gel regenerated cellulose film in the conventional manner. After being washed, desulfured, bleached, softened and dried, the film, which was .001 inch thick, was passed through the coating composition embodying the present invention at room temperature (18–25° C.), The coated composition was prepared from the following ingredients:

| | Parts |
|---|---|
| Water | 400 |
| Vinylidene chloride | 380 |
| Methyl acrylate | 20 |
| Itaconic acid | 8 |
| "Duponol" ME (sodium lauryl sulfate) | 8 |
| "Darvan" #1 (condensation product of sodium beta naphthalene sulfonate and formaldehyde) | 4 |
| Ammonium persulfate | 2 |
| Meta-sodium bisulfite | 1 |

The water, ammonium persulfate and "Duponol" ME were placed in a round-bottom vessel. The vessel, fitted with a reflux condenser and a stirrer, was immersed in a water bath maintained at 33° C.–34° C. After stirring until solution was complete, the premixed monomers (vinylidene chloride, methyl acrylate and itaconic acid) were added followed by the addition of the meta-sodium bisulfite. Polymerization was accomplished by refluxing at the prevailing temperature, 33° C.–34° C. After 1½ hours, refluxing ceased indicating that polymerization was substantially complete. Stirring was continued for another 30 minutes to assure complete polymerization. "Darvan" #1 was then added to the dispersion.

The dispersion was coated on both sides of the regenerated film to the extent of 6 grams of polymer per square meter of film. The coated film was then passed through smoothing rolls, dried, and collected. The film surfaces appeared streaky and the coating was not spread uniformly over the surface.

In a separate run 232 parts of ethylene glycol (22% of the total weight of the dispersion) was added to the dispersion following the addition of "Darvan" #1 and the coating dispersion was applied to the regenerated cellulose film to the extent of 6 grams of polymer per square meter of film. After smoothing and drying, it was obvious that the final film was clear, transparent, and uniformly spread over the surface of the film.

In a laboratory test, it was discovered that without ethylene glycol the above coating hardened in less than 0.1 second. With 22% ethylene glycol dissolved in the dispersion, the hardening time was increased more than tenfold.

The following examples are additional specific embodiments of the invention. Unless otherwise stated parts and percentages in the examples are by weight and coating was performed at room temperature.

Example I

A regenerated cellulose film .001 inch thick, produced in the conventional manner, was passed through an aqueous dispersion prepared from the following ingredients:

| | Parts |
|---|---|
| Water | 400 |
| Vinylidene chloride | 368 |
| Methyl acrylate | 14 |
| Acrylonitrile | 10 |
| Itaconic acid | 8 |
| Duponol ME | 8 |
| Darvan #1 | 4 |
| Ammonium persulfate | 0.8 |
| Meta-sodium bisulfite | 0.4 |

The dispersion was prepared in the manner described for the specific embodiment and was applied in the previously described manner to the extent of 6 grams of polymer per square meter of film. In a second run, 204 parts of glycerol (22.3% of the total weight of the dispersion) was added to the coating dispersion. After smoothing, drying and collecting the coated films, the properties of both films were measured.

Tenacity, elongation, flexibility, heat-sealability and moisture resistance were substantially independent of the presence of glycerol. However, the appearance of the two films was substantially different. With glycerol present, the surface was no longer streaky and uneven as it was without glycerol.

In a separate laboratory test, the use of 20% glycerol, as in the above example, was found to increase the hardening time almost ten-fold.

Example II

Results similar to those experienced in Example I were found when the aqueous dispersion was prepared from the following ingredients:

| | Parts |
|---|---|
| Water | 200 |
| Vinylidene chloride | 184 |
| Butyl methacrylate | 16 |
| Itaconic acid | 4 |
| Duponol ME | 4 |
| Darvan #1 | .2 |
| Ammonium persulfate | 1 |
| Meta-sodium bisulfite | 0.5 | when compared to a dispersion containing, in addition to the above ingredients 110 parts ethylene glycol (21.5%).

Example III

Example I was repeated with the following ingredients in the coating dispersion:

| | Parts |
|---|---|
| Water | 90 |
| Vinylidene chloride | 81 |
| Vinyl chloride | .9 |
| Itaconic acid | 1.8 |
| Sulfated methyl oleate | 1.8 |
| Darvan #1 | 1 |
| Ammonium persulfate | 0.45 |
| Meta-sodium bisulfite | 0.23 |
| Glycerol (23%) | 55 |

The results were substantially the same as those found in Examples I and II; a non-streaky, uniformly-coated regenerated cellulose film having excellent strength, moisture resistance and heat-sealability was produced.

Example IV

Example I was repeated except that one aqueous dispersion used in the coating step was prepared by reacting the following ingredients for 2½ hours at 50° C.:

| | Parts |
|---|---|
| Water | 90 |
| Vinylidene chloride | 82.8 |
| Methacrylonitrile | 7.2 |
| Itaconic acid | 1.8 |
| Sulfated methyl oleate | 4.5 |
| Darvan #1 | 1 |
| Ammonium persulfate | 0.9 |
| Meta-sodium bisulfite | 0.45 | and a second dispersion also contained 53.3 parts (21.8%) ethylene glycol. The coated regenerated cellulose films displayed substantially identical properties. However, the surfaces of the film coated with the dispersion containing ethylene glycol were smooth, uniform and not streaky compared to poorly appearing film surfaces when the dispersion did not contain ethylene glycol.

Example V

In the following series of tests, a regenerated cellulose film, .001 inch thick and containing 13% ethylene glycol, about 3%–5% water and about 0.5% of a modified urea-formaldehyde resin was coated with the aqueous dispersion presented in Example I. In tests 1–18, the aqueous dispersion also contained a compound to retard hardening. The following table summarizes the results:

TABLE I

| Test | Compound | Percent | Hardening Time (Seconds) |
|---|---|---|---|
| Control | none | | 0.1 |
| 1 | Glycerol | 10 | 0.8 |
| 2 | do | 20 | 1.6 |
| 3 | Propylene glycol | 10 | 0.8 |
| 4 | do | 20 | 1.6 |
| 5 | 1,2,6-hexanetriol | 10 | 0.8 |
| 6 | do | 20 | 7.0 |
| 7 | 1,2,4-butanetriol | 10 | 0.8 |
| 8 | do | 20 | 2.8 |
| 9 | Sorbitol | 10 | 0.7 |
| 10 | do | 20 | 1.4 |
| 11 | Diethylene glycol | 10 | 0.6 |
| 12 | do | 20 | 3.6 |
| 13 | Triethylene glycol | 10 | 0.8 |
| 14 | do | 20 | 4.4 |
| 15 | Polyethylene glycol (200 Molecular weight) | 10 | 0.6 |
| 16 | do | 20 | 5.6 |
| 17 | Polyethylene glycol (400 Molecular weight) | 10 | 1.8 |
| 18 | Ethylene glycol | 20 | 0.9 |

From the table it will be evident that adequate retardation may be obtained with as little as 10% retardant and perhaps, slightly less than 10% with some retardants. However, in general, 10%–30% of a polyhydric alcohol or polyglycol provides the desirable results of this invention. The maximum molecular weight polyglycol that has been found useful is one having a molecular weight of 400.

While the invention has been described for the coating of regenerated cellulose film, the invention will provide similar improvements in the coating of other hydrophilic bases such as polyvinyl alcohol film, hydroxyethyl cellulose film, hydroxypropyl cellulose film, films of partially hydrolyzed ethylene-vinyl acetate copolymers and paper.

The following theory is offered as an explanation of the mechanism of the invention but in no way should be construed as limitative. The premature hardening of the coalescible, organic, polymeric, film coating on the hydrophilic base is caused by the rapid loss of water from the aqueous dispersion of the coating into the hydrophilic base. The polyhydric alcohols and the polyglycols of this invention are also absorbed into the film but at a slower rate than the rate of water absorption. The presence of these compounds in the coating composition, therefore, prevents the rapid penetration of water into the base and thus serves to retard the setting-up of the polymer coatings on the surface of the base.

It is obvious that the additives of this invention will be useful whenever an aqueous dispersion of an organic, coalescible, polymeric, film-former is being applied as a coating to a hydrophilic base and premature hardening of the film-former is a problem. The use of these retardant compounds in aqueous dispersions of vinylidene chloride copolymers are particularly useful because of the importance of such copolymers in imparting moisture resistance and heat-sealability to regenerated cellulose film. While copolymers of vinylidene chloride with methyl acrylate, acrylonitrile, butyl methacrylate, vinyl chloride and methacrylonitrile have been illustrated in the embodiments other mono-olefinic monomers copolymerizable with vinylidene chloride may be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single "$CH_2=C<$" group, the most useful ones falling within the general formula $$CH_2=C\begin{matrix}R\\X\end{matrix}$$

where R may be hydrogen, a halogen or a saturated aliphatic radical and X is selected from one of the following groups:

$$-Cl, -Br, -F, -CN, -C_6H_5, -COOH$$

$$-C\begin{matrix}O\\OR'\end{matrix}, -C\begin{matrix}O\\R'\end{matrix}, -C\begin{matrix}O\\H\end{matrix}$$

$-OC_6H_5$, $-CONH_2$, $-CONH-R'$, and $-CONR'_2$, in which R' is alkyl. Unsaturated aliphatic acids such as itaconic acid, acrylic acid and methacrylic acid may be advantageously used in the preparation of the coating compositions.

The coatings may be applied in accordance with any known coating techniques. They may be applied by passing the film through baths in a continuous manner or in a batch manner. The coatings may also be sprayed onto the film or applied by brushing or the like. Ordinarily, the coatings are applied at room temperature. However, since the coatings are applied from aqueous dispersions, elevated temperatures provide no particular hardship. This is a distinct advantage over the use of organic solvents where elevated temperatures tend to evaporate substantial amounts of the solvent.

An important advantage of this invention stems from the fact that some of the compounds within the category of useful retardants are also softeners. Ethylene glycol and glycerol may be used both as softeners for gel regenerated cellulose film and as retardants in coating the final regenerated cellulose film. It has been found that after applying the softener to the gell film, then drying it and winding it on a roll, any slight excess of softener used in the softening step produced sticking of the film when it was unwound for coating. This was particularly true when an anchorage resin such as the modified urea-formaldehyde resin illustrated in Example V or in general any cationic thermosetting resin was incorporated into the regenerated cellulose film. However, the retardant, when incorporated in the coating composition, will penetrate into the base film. If the retardant is also a softener, the requirement of softener in the softening step is reduced and the possibility of sticky film is eliminated. It is worth mentioning again that the retardant or softener added to gel regenerated cellulose film prior to drying and coating does not provide any substantial retarding effect during the subsequent coating step. Instead, it is obvious that, by producing a sticky film prior to coating, this procedure is deleterious.

Other advantages of the process stem from its simplicity—no substantial alteration of the conventional process is required; its economy—the compounds are relatively inexpensive; and its effect on the product—a uniformly coated base film that is moisture proof and heat-sealable yet flexible, transparent, and strong is produced.

The coated regenerated cellulose films produced by employing the present invention are useful wherever regenerated cellulose films have heretofore been used. They serve advantageously as moisture proof packaging materials for foods, cigarettes and the like. They are particularly useful where the packages must be shipped great distances. Furthermore, these films are outstanding as a vacuum and pressure packaging material in the packaging of luncheon meats, cheese, nuts, etc.

As many widely different embodiments can be made without departing from the spirit and scope of this invention, this invention is not limited except as defined in the appended claims.

What is claimed is:

1. In a process for coating softened regenerated cellulose film with a moisture-resistant coating, the improvement which comprises passing the film through an aqueous dispersion containing 5%–60% of a copolymer of vinylidene chloride with at least one other mono-olefinic monomer copolymerizable with vinylidene chloride and dissolved therein 10%–30% of a compound selected from the group consisting of polyhydric alcohols and polyglycols; removing excess dispersion from the film; smoothing said dispersion on the surface of the film and drying the coated film.

2. In a process for coating softened regenerated cellulose film with a moisture-resistant coating, the improvement which comprises passing the film through an aqueous dispersion containing 5%–60% of a copolymer of vinylidene chloride with at least one other mono-olefinic monomer copolymerizable with vinylidene chloride and dissolved therein 10%–30% of ethylene glycol; removing excess dispersion from the film; smoothing said dispersion on the surface of the film and drying the coated film.

3. In a process for coating softened regenerated cellulose film with a moisture-resistant coating, the improvement which comprises passing the film through an aqueous dispersion containing 5%–60% of a copolymer of vinylidene chloride with at least one other mono-olefinic monomer copolymerizable with vinylidene chloride and dissolved therein 10%–30% of propylene glycol; removing excess dispersion from the film; smoothing said dispersion on the surface of the film and drying the coated film.

4. In a process for coating softened regenerated cellulose film with a moisture-resistant coating, the improvement which comprises passing the film through an aqueous dispersion containing 5%–60% of a copolymer of vinylidene chloride with at least one other mono-olefinic monomer copolymerizable with vinylidene chloride and dissolved therein 10%–30% of diethylene glycol; removing excess dispersion from the film; smoothing said dispersion on the surface of the film and drying the coated film.

5. In a process for coating softened regenerated cellulose film with a moisture-resistant coating, the improvement which comprises passing the film through an aqueous dispersion containing 5%–60% of a copolymer of vinylidene chloride with at least one other mono-olefinic monomer copolymerizable with vinylidene chloride and dissolved therein 10%–30% of polyethylene glycol having a molecular weight of 200; removing excess dispersion from the film; smoothing said dispersion on the surface of the film and drying the coated film.

6. In a process for coating softened regenerated cellulose film with a moisture-resistant coating, the improvement which comprises passing the film through an aqueous dispersion containing 5%–60% of a copolymer of vinylidene chloride with at least one other mono-olefinic monomer copolymerizable with vinylidene chloride and dissolved therein 10%–30% of glycerol; removing excess dispersion from the film; smoothing said dispersion on the surface of the film and drying the coated film.

7. In a process for coating softened regenerated cellulose film with a moisture-resistant coating, the improvement which comprises passing the film through an aqueous dispersion containing 35%–60% of a copolymer of vinylidene chloride with at least one other mono-olefinic monomer copolymerizable with vinylidene chloride and dissolved therein 10%–30% of a compound selected from the group consisting of polyhydric alcohols and polyglycols; removing excess dispersion from the film; smoothing said dispersion on the surface of the film and drying the coated film.

8. In a process for coating softened regenerated cellulose film with a moisture-resistant coating, the improvement which comprises passing the film through an aqueous dispersion containing 35%–60% of a copolymer of vinylidene chloride with methyl acrylate and dissolved therein 18%–23% of ethylene glycol; removing excess dispersion from the film; smoothing said dispersion on the surface of the film and drying the coated film.

9. In a process for coating softened regenerated cellulose film with a moisture-resistant coating, the improvement which comprises passing the film through an aqueous dispersion containing 40%–60% of a copolymer of vinylidene chloride with at least one compound selected from the group consisting of methyl acrylate, acrylonitrile, butyl methacrylate, vinyl chloride and methacrylonitrile and containing dissolved therein 18% to 23% based on the total weight of the aqueous dispersion of ethylene glycol; removing excess dispersion and smoothing the dispersion during a period of at least 0.5 second; and drying the coated regenerated cellulose film to form a coating .00003″ to .0008″ thick of said copolymer on said regenerated cellulose film.

References Cited in the file of this patent

UNITED STATES PATENTS

| | | |
|---|---|---|
| 2,525,676 | Hoffman | Oct. 10, 1950 |
| 2,684,919 | Berry | July 27, 1954 |
| 2,721,150 | Grantham | Oct. 18, 1955 |
| 2,728,688 | Wellisch | Dec. 27, 1955 |
| 2,790,736 | McLaughlin | Apr. 30, 1957 |
| 2,819,984 | Ackerman | Jan. 14, 1958 |
| 2,835,595 | Salatiello | May 20, 1958 |
| 2,849,319 | Weinmann | Aug. 26, 1958 |